United States Patent
Murcia et al.

(10) Patent No.: US 12,504,375 B2
(45) Date of Patent: Dec. 23, 2025

(54) METHOD FOR MONITORING AND CONTROL OF A WASTEWATER PROCESS STREAM

(71) Applicant: Ecolab USA Inc., St. Paul, MN (US)

(72) Inventors: Michael J. Murcia, DeKalb, IL (US); Prasad Y. Duggirala, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 18/380,961

(22) Filed: Oct. 17, 2023

(65) Prior Publication Data

US 2024/0044794 A1 Feb. 8, 2024

Related U.S. Application Data

(63) Continuation of application No. 17/491,897, filed on Oct. 1, 2021, now abandoned, which is a continuation of application No. 16/295,797, filed on Mar. 7, 2019, now abandoned, which is a continuation of application No. 13/242,014, filed on Sep. 23, 2011, now abandoned, which is a continuation-in-part of application No. 12/405,807, filed on Mar. 17, 2009, now abandoned.

(51) Int. Cl.
*G01N 21/64* (2006.01)
*G01N 21/51* (2006.01)

(52) U.S. Cl.
CPC .......... *G01N 21/643* (2013.01); *G01N 21/51* (2013.01); *G01N 2021/6432* (2013.01); *G01N 2021/6491* (2013.01)

(58) Field of Classification Search
None
See application file for complete search history.

(56) References Cited

U.S. PATENT DOCUMENTS

| | | |
|---|---|---|
| 5,400,137 A | 3/1995 | Winslow et al. |
| 5,489,977 A | 2/1996 | Winslow et al. |
| 2005/0168741 A1 | 8/2005 | Banks |
| 2007/0048503 A1* | 3/2007 | MacDonald ............ A61F 13/42 428/195.1 |
| 2008/0308241 A1 | 12/2008 | Di Cesare |
| 2009/0084510 A1 | 4/2009 | Perry et al. |
| 2009/0260767 A1 | 10/2009 | Gerli et al. |
| 2010/0236732 A1 | 9/2010 | Gerli et al. |

FOREIGN PATENT DOCUMENTS

| | | |
|---|---|---|
| WO | WO 98/25856 A1 | 6/1998 |
| WO | WO 2007/082376 A1 | 7/2007 |
| WO | WO 2008/104576 A1 | 9/2008 |
| WO | WO 2008/144383 A1 | 11/2008 |
| WO | WO 2010/007390 A2 | 1/2010 |

OTHER PUBLICATIONS

Bradley et al., "A review of attenuation correction techniques for tissue fluorescence," *Journal of the Royal Society Interface*, 3: 1-13 (2006).
European Patent Office, Extended European Search Report in European Patent Application No. 12834430.6, May 18, 2015, 7 pp.
Fletcher et al., "Behavior of the solvatochromic probes Reichardt's dye, pyrene, dansylamide, Nile Red and 1-pyrenecarbaldehyde within the room-temperature ionic liquid bmimPF6" Royal Society of Chemistry, (2001) vol. 3, pp. 210-215.

\* cited by examiner

*Primary Examiner* — Xiaoyun R Xu
(74) *Attorney, Agent, or Firm* — Kagan Binder PLLC

(57) ABSTRACT

The invention is directed towards methods, compositions, and apparatus for accurately detecting the presence and amounts of contaminants in wastewater. The method comprises the steps of adding to a volume of wastewater at least one tracer molecule, observing the tracer for indications of particular contaminants, conducting at least one second form of contamination detection, and interrelating the two measured properties to identify the specific composition of the contamination. Using a tracer molecule allows for the detection of otherwise hard to detect oils and grease. Use of the second method however compensates for tracer interfering contaminants and allows for more accurate readings. The invention includes feeding of functional chemicals in response to the detections and conducting the detections online and continuously.

19 Claims, No Drawings

METHOD FOR MONITORING AND CONTROL OF A WASTEWATER PROCESS STREAM

CROSS-REFERENCE TO RELATED APPLICATIONS

This Application is a continuation of U.S. patent application Ser. No. 17/491,897, filed Oct. 1, 2021, which is a continuation of U.S. patent application Ser. No. 16/295,797, filed Mar. 7, 2019, which is a continuation of U.S. patent application Ser. No. 13/242,014, filed Sep. 23, 2011, which is a continuation-in-part of U.S. patent application Ser. No. 12/405,807 filed on Mar. 17, 2009, the disclosures of which are incorporated herein in their entireties by reference for all purposes.

STATEMENT REGARDING FEDERALLY SPONSORED RESEARCH OR DEVELOPMENT

Not Applicable.

BACKGROUND OF THE INVENTION

The present invention relates generally to methods of, and apparatus and compositions of matter useful in wastewater processing. Various industrial processes result in numerous forms of contamination, collecting in wastewater such as grease and oils. This contamination is problematic as it complicates the manner in which the wastewater can: be disposed of Various techniques are available for disposing of contaminating oils and grease but they are dependent on knowing what kind and how much of various contaminants are present within a volume of wastewater.

Various prior art methods exist to determine the contaminant content of wastewater. These methods include gravimetric analysis, direct measurements (such as US EPA Method 1664), colorimetric methods, UV methods, Fluorescent methods, IR Absorption, and gas chromatography. Many of these methods are described in both online and offline forms in International Patent Application WO 2010/007390 A2.

Of these methods, a particularly interesting approach is the use of polarity-sensitive fluorescent dyes. These dyes interact such that when particular oils are present they delectably fluoresce but do not fluoresce when those oils are absent. This method however suffers from detection difficulties because background, interference and the interplay of multiple oil types result in confusing and unreliable fluorescence readings.

It is therefore useful and desirable to provide methods and apparatus to better detect the presence of oils and grease in wastewater. The art described in this section is not intended to constitute an admission that any patent, publication or other information referred to herein is "Prior Art" with respect to Hits invention, unless specifically designated as such. In addition, this section should not be construed to mean that a search has been made or that no other pertinent information as defined in 37 CFR § 1.56(a) exists.

BRIEF SUMMARY OF THE INVENTION

At least one embodiment of the invention is directed to a method of accurately detecting the presence and amounts of specific contaminants in at least one liquid comprising the steps of: 1) providing a volume of liquid, 2) conducting a method of contamination detection capable of measuring the amount of turbidity in the volume of liquid and interring from that the amount of turbidity causing contaminants within the liquid, 3) selecting a correcting factor by identifying which of a series of pre-determined correction factors corresponds with the degree to which the measured amount of turbidity scatters light coming from a specific tracer and thereby alters die amount of a change in fluorescence that occurs within the specific liquid when the tracer is in the presence of an oil, 4) introducing the specific tracer into the liquid, 5) measuring the change in fluorescence emitted by introducing the specific tracer into the liquid, 6) correcting the measured change in fluorescence by adjusting the measured change according to the selected correction factor, 7) calculating the amount of oil within the liquid from the corrected measured change in fluorescence, and 8) calculating the amount of non-oil contaminant within the liquid by subtracting the calculated amount of oil from the calculated amount of turbidity causing contaminants.

The tracer may be polarity-sensitive and displays detectable properties when in water and in the presence of oil but not when in water absent tire oil. The tracers fluorescence may be quenched when in the presence of oil or enhanced when in the presence of oil. The method may farther comprise the step of measuring the tracer both before and after adding the adding the non-polar-contaminant removing chemical and using the difference in measurements to determine the amount of non-polar-contaminant in the liquid, lire liquid may be selected from the list consisting of: wastewater clarifier effluent or influent, water, alcohol, and any combination thereof. The method may further comprise using an optical emission source, which emits light into the liquid thereby facilitating the detection of the tracer's properties. The detectable properties may be detected by an apparatus constructed and arranged to detect at a particular setting selected from the list consisting of: wavelength, emission intensity, absorbance of emitted light or energy, and any combination thereof. The non-oil turbidity may be identified as solid particulates. The method may further comprise the step of adding a functional chemical to the liquid in response to the detected contaminant, the functional chemical being one that which is particularly suited to remediate the presence of the particular contaminant detected. The functional chemical may be selected from the list consisting of: biocides, dispersants, flocculant, surfactants, emulsifiers, demulsifiers, inorganics, acid, base, corrosion inhibitors, water, and solvent. The liquid may be a sample diverted from a process stream and the detection is performed on the sample. The detection may be performed on a continuous basis and the tracer detection is optimized for a specific flow of liquid past a sensor. The method may further comprising using control equipment in informational connection with the detections wherein the control equipment receives data from the detection and appropriately releases at least one functional chemical into the liquid. The material causing the turbidity may emit its own fluorescence and the correction factor takes the turbidity emitted fluorescence into account.

Additional features and advantages are described herein, and will be apparent from, the following Detailed Description.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Bulk sample" means a sample whose constituents have not been specifically separated, except bulk sample may include, a separation based upon size.

"Oil" means any liquid having a higher viscosity than water and includes but is not limited to hydrocarbon liquids and grease.

"Polarity Sensitive" means a composition of matter (including but not limited to a dye) that has a shifting absorbance and/or fluorescence emission wavelength depending on the polarity of its surroundings and/or the presence of hydrophobic materials.

"Solvatochromatic" means a composition of matter (including but not limited to is a dye) that has a shifting absorbance and/or fluorescence emission wavelength depending on the polarity of its surroundings.

"Tracer" means a composition of matter which reacts to the presence of an oil within another liquid by changing the degree to which it fluoresces light, the change may be an increase, decrease, initiation, and/or termination of fluorescence.

"Turbidity" means the extent to which there is a decrease in the transparency of a liquid due to the presence of transparency reducing materials within the liquid, such materials Include but are not limited to oil, solid particulate matter, dissolved matter, dispersed matter, and any combination thereof, changes in turbidity may or may not accompany changes in viscosity or other properties of the liquid.

"Wastewaterprocess" means any process in which wastewater influent is treated and is released as effluent.

In the event that the above definitions or a description stated elsewhere in this application is inconsistent with, a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined In the claims.

The present invention relates generally to a method and apparatus for using one or more sensors to control the feed of functional chemicals to a wastewater handling process. In at least one embodiment two or more properties of a wastewater volume is detected and in response to the detected properties one or more functional chemicals are added to the wastewater. The properties include but are not limited to any combination of one some or all of: turbidity, suspended solids, solvent extraction, streaming potential, TOC (total organic carbon), BOD (biological oxygen demand), QRP (oxygen-reduction potential), pH, temperature, liquid flow, mass flow, absorbance of various light spectra, and fluorescence. The functional chemicals include but are not limited to biocides, dispersants, flocculant, surfactants, emulsifiers, demulsifiers, acid, base, corrosion inhibitors, water, and solvent.

By looking at two or more parameters, a problem faced by many prior art methods is overcome. Because no single measurement can account for every kind of contaminant in wastewater, prior art methods using only one detection method would provide incomplete, results. For example TSS is commonly used to account for the level of solids contamination in wastewater, TSS however will not account for grease and oil. In at least one embodiment, a TSS measurement is conducted as well as a solvent extraction process to account for oils and grease as well.

In at least one embodiment at least one of the parameters is detected by placing a tracer molecule in the water. A tracer molecule is a molecule, which undergoes a detectable change when a particular contaminant is present in a volume of water. In at least one embodiment the molecule is a solvatochromatic tracer. In at least one embodiment the detectable change in the tracer is detectable using at least one of fluorescence spectroscopy and absorbance spectroscopy. In at least one embodiment the tracer is one of the sort described in, and is used in the manner described in US Published patent application 2009/0260767 and/or U.S. patent application Ser. No. 12/405,797.

In another embodiment, the dye is selected from 9-diethylamino-5H-benzo[alpha]phenoxazine-5-one, 1-dimethylamino-5-sulfamoyl-naphthalene, pyrene, 1-pyrenecarbaldehyde, Reichardt's dye, 4-aminophthalimide, 4-(N,N-dimethylamino)phthalimide, bromonapthalene, 2-(dimethylamino)naphthalene, and combinations thereof.

In at least one embodiment the method of accurately detecting the presence and amounts of specific contaminants in at least one liquid comprises the following steps:
  providing a volume of liquid,
  conducting a method of contamination detection capable of measuring the amount of turbidity in the volume of liquid,
  selecting a correcting factor by identifying which of a series of pre-determined correction factors corresponds with the degree to which the measured amount of turbidity scatters light coming from a specific tracer and thereby alters the amount of a change in fluorescence that occurs within the specific liquid when the tracer is in the presence of an oil, introducing the tracer molecule into the liquid,
  measuring the change in fluorescence emitted by introducing the first tracer molecule into the liquid,
  correcting the measured change in fluorescence by adjusting the measured change according to the selected correction factor,
  calculating the amount of oil within the liquid from the corrected measured change in fluorescence, and
  calculating the amount of non-oil contaminant within the liquid by subtracting the calculated amount of oil from the calculated amount of turbidity.

This method allows for the determination of how much of the turbidity is caused by the oil and how much my dispersed particulate matter. It overcomes previous problems that resulted from the turbidity interfering with the effects of the tracer molecule and thereby providing incorrect florescence readings.

In at least one embodiment more than one tracer is used. This addresses situations in which a single tracer is not accurate in the presence of every sort of contaminant. In at least one embodiment the tracer is polarity-sensitive.

In at least one embodiment a combination of sensors is used to determine the demand for functional chemicals and/or to control the dosage of said chemicals. In at least one embodiment the tracer molecule is used to determine the level of hydrophobic contaminants in the process stream. The discharge of hydrophobic materials is important not only from a regulation standpoint, but it can also negatively impact the biological activity in aerobic basins. Therefore, the use of a solvatochromatic tracer is used in addition to conventional measurements as a means of determining the level of hydrophobic contamination in a process stream to be used in a system controlling the dose of functional chemicals added to clean the process waters. In at least one embodiment the tracer molecule may require the use of fluorescence spectroscopy, absorbance spectroscopy or a combination of the two measurements. The measurement of hydrophobic contamination may also prove to be more accurate with the use of more than a single tracer dye. Wastewater can contain substances that may interfere with either the measurement of fluorescence emission or overlap with the absorption peak of a tracer. Therefore, the use of more than one type of tracer dye is more favorable in determining the level of hydrophobic contamination in a process stream, especially if the means of measurement are different (fluorescence vs, absorbance).

In at least one embodiment, in order to properly measure the fluorescence emission using a solvatochromatic tracer, a fluorometer is customized for particular wavelength, excitation, and gain settings. In at least one embodiment the water sample being measured is online and the fluorometer is customized for a particular flow rate and tracer dose rate. Because the maximum intensity of a polarity-sensitive dye is related to how hydrophobic the particular contaminant is, in at least one embodiment the fluorometer is constructed and arranged to measure the changing fluoroesence intensity and changing emission wavelength. In at least one embodiment the fluorometer is constructed and arranged to compensate for changes in these detections in compensation for the medium surrounding the dye.

In at least one embodiment the tracer is provided a sufficient amount of time to interact with the contaminant before the detection process is concluded.

In at least one embodiment, after the tracer is added to a water sample, at least one functional chemical is added to the sample, which decreases the presence of known non-polar contaminants. The detection of the tracer is often enhanced by reducing the presence of non-polar contaminants, which might otherwise interfere with the tracer.

In at least one embodiment, the detectable properties of a tracer is observed both before and after a functional chemical is added to the sample which decreases the presence of known non-polar contaminants to determine the quantity of non-polar contaminants within the sample.

In at least one embodiment the sample to be analyzed is the effluent and/or the influent of a wastewater clarifier, (also add DAF, aeration basin, membrane)

In at least one embodiment the tracer is mixed with a solvent prior to its introduction into a water volume.

The tracer detections can be performed according to a pre-determined schedule, intermittently, or continuously. In at least one embodiment the wastewater volume is analyzed by a handheld analyzer. In at least one embodiment the tracer is added directly to a wastewater containing tank or pipe. In at least one embodiment the analyzed volume is a sample diverted from the process stream. In at least one embodiment the detection results are fed to control equipment, which appropriately add functional chemicals to the wastewater process stream in response to and to remedy the detection results. In at least one embodiment this control and detection equipment form a closed control loop.

In at least one embodiment, to properly measure the fluorescence emission using a solvatochromatic tracer, a fluorometer is customized for the proper excitation and emission wavelengths, gain settings and, in the ease of online measurement, the proper flow rate of the sample through the fluorometer and dose of solvatochromatic tracer.

Due to the nature of solvatochromatic dyes, it is expected that the emission wavelength has a maximum intensity that is dependent on the degree of hydrophobicity of the sample. Therefore, the fluorometer must be is set up to measure both the fluctuating fluorescence intensity, and the changing emission $\lambda_{max}$ depending on the medium surrounding the dye.

By using the output from a combination of the aforementioned signals, the present invention also provides for a method for measuring the effectiveness of one or more chemicals that decrease the amount of one or more contaminants in a wastewater process: (a) monitoring one or more types of contaminants in a wastewater process comprising: obtaining a bulk sample of fluid from said wastewater process; selecting a solvatochromatic dye that is capable of interacting with said contaminants in said fluid and providing an optical signal in said fluid; adding said dye to said fluid and allowing a sufficient amount of time for said dye to interact with said contaminants in said fluid; measuring the fluorescence, absorbance or spectral shift of the dye in said fluid; arid correlating the response of the dye with fee concentration of said contaminants; (b) adding one or more chemicals to said wastewater process that decrease the amount of said nonpolar contaminants in said wastewater process; (c) re-measuring the amount of contaminants in said wastewater process by performing step (a) at least one more time; and (d) optionally controlling the amount of said chemicals that are added to said wastewater process.

In at least one embodiment the process applies to measuring the effectiveness of one or more chemicals that decrease the amount of one or more contaminants in a wastewater process using the other aforementioned signals, such as turbidity, suspended solids, solvent extraction, streaming potential, TOC, BOD, ORP, pH, temperature or absorbance.

In at least one embodiment the method involves monitoring one or more types of nonpolar materials in a wastewater process comprising: (a) obtaining a sample of fluid from said wastewater process: (b) selecting a solvatochromatic dye that is capable of interacting with said nonpolar materials in said fluid and providing an optical signal in said fluid; (c) adding said dye to said fluid and allowing a sufficient amount of time for said dye to interact with said nonpolar materials in said fluid; (d) measuring the fluorescence, absorbance or spectral shift of the dye in said fluid; (e) correlating the optical response of the dye with the concentration of said contaminants; and (f) optionally controlling the amount of one or more chemicals added to said wastewater process that reduce, separate or inactivate said nonpolar materials.

In at least one embodiment the method is for monitoring one or more types of nonpolar materials in a wastewater process comprising: (a) obtaining a sample of fluid from said wastewater process; (b) selecting a solvatochromatic dye that is capable of interacting with said nonpolar materials in said fluid and providing an optical signal in said fluid; (c) adding said dye to said fluid and allowing a sufficient amount of time for said dye to interact with said nonpolar materials in said fluid; (d) measuring the fluorescence, absorbance or spectral shift of the dye in said fluid; (e) correlating the optical response of the dye with the concentration of said contaminants; and (f) optionally controlling the amount of one or more chemicals added to said wastewater process that reduce, separate or inactivate said nonpolar materials.

In at least one embodiment the method is for monitoring one or more types of one or more chemicals that decrease the amount of one or more nonpolar contaminants in a wastewater process: (a) monitoring one or more types of contaminants in a wastewater process comprising: obtaining a bulk sample of fluid from said wastewater process; selecting a solvatochromatic dye that is capable of interacting with said contaminants in said fluid and providing an optical signal in said fluid; adding said dye to said fluid and allowing a sufficient amount of time for said dye to interact with said contaminants In said fluid; measuring the fluorescence, absorbance or spectral shift of the dye in said fluid; and correlating the response of the dye with the concentration of said contaminants; (b) adding one or more chemicals to said wastewater process that decrease the amount of said nonpolar contaminants in said wastewater process; (e) re-measuring the amount of contaminants in said wastewater process by performing step (a) at least one more time; and (d) optionally controlling the amount of said chemicals that are added to said wastewater process.

It is important to note that the technique can be used in a batch manner, where a sample is taken from the process and measured occasionally, or in a continuous manner where the measurement is made in a sidestream that is being treated with the solvatochromatic dye.

In at least one embodiment the dyes that are added to the sample are able to stain or interact wife the nonpolar contaminants, e.g. oil, grease, fats, surfactants.

In at least one embodiment, the turbidity of the fluid is also measured. In a further embodiment, die turbidity of said fluid is measured before and after the addition of said chemicals. In another embodiment, the sample is taken from a dilute sample point off a wastewater process, e.g. the effluent of the clarifier. In a further embodiment, the sample point is the influent of a clarifier. The reasoning postulated for this collection/sample point is that the performance of the clarification/separation step can be monitored by measuring the concentration of nonpolar contaminants in the influent and effluent.

In at least one embodiment the dye added to a sample has a sufficient amount of time to Interact with the contaminants in the fluid prior to its fluorescent measurement. One of ordinary skill in the art could determine a sufficient amount of time for said interaction without undue experimentation.

In one embodiment, the dye is mixed with a solvent prior to its addition to said fluid. One of ordinary skill in the art could determine an adequate time for mixing without undue experimentation.

In another embodiment, the nonpolar contaminants are selected from the group consisting of; oil, grease, petroleum-based nonpolar hydrocarbons, amphiphiles, fats, fatty acids, aromatics, surfactants, polymers and a combination thereof.

In another embodiment, the method is an on-line method and/or batch sample method.

In another embodiment, the optical measurement (absorbance, fluorescence) is performed at a pre-set basis, intermittent basis, and/or continuous basis. For example, a flow cell can be utilized as a means for measuring the fluorescence or absorbance of said nonpolar contaminants. More specifically, in one embodiment, a process for measurement comprises: the addition of one or more optical tracers to a sample obtained from a wastewater process prior to its optical measurement in said flow cell. One of ordinary skill in the art would be able to carry out this process without undue experimentation. For example, one could utilize flow injection analysis and/or sequence injection analysis techniques to carry out the above-referenced measurement protocol.

In another embodiment, the optical measurement is performed with a handheld spectrometer. An optical measurement may be carried out with other types of fluorometers or absorbance spectrometers.

The present invention also provides for a method of measuring the effectiveness of one or more chemicals that separate nonpolar materials from a wastewater process. The information on the amount of nonpolar contaminants in a fluid can be utilized to form a control loop for the addition of one or more chemicals, which can be used to control the amount of nonpolar contaminants.

In one embodiment, the methodology for monitoring the nonpolar contaminants can be measured by the above-stated fluorescence, absorbance or spectral shift methodology and its various embodiments.

In another embodiment, a determination of the amount of nonpolar contaminants is measured by the above-mentioned protocol, then subsequent to this step, an addition of one or more chemicals to the wastewater process to treat the contaminants, e.g. increase/decrease in the same chemistry for contaminant separation or change in the chemistry treatment program for contaminant separation, and then subsequent to the treatment step, a re-measurement of the amount of contaminants in said wastewater process by the above-mentioned protocol.

In another embodiment, the chemicals are at least one of the following: a coagulant; a flocculant; a dispersant; an acid; an inorganic; a demulsifier; and a surfactant.

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein and with or without the exclusion of one or more of those various described and/or incorporated embodiments.

The above disclosure is intended to be illustrative and not exhaustive. This description will suggest many variations and alternatives to one of ordinary skill in this art. All these alternatives and variations are intended to be included within the-scope of the claims where the term "comprising" means "including, but not limited to". Those familiar with the art may recognize other equivalents to the specific embodiments described hereto which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with, a maximum value of 10 or less, (e.g. 2,3 to 9,4, 3 to 8, 4 to 7), and finally to each number 1, 2, 3, 4, 5, 6, 7, 8, 9, and 1.0 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of treating a contaminated fluid comprising a nonpolar contaminant and water and having a measured turbidity, said method comprising the steps of:
   a. introducing a solvatochromatic tracer into a sample of the contaminated fluid, wherein the solvatochromatic tracer undergoes a wavelength shift in fluorescence when the nonpolar contaminant is present in the contaminated fluid, wherein the wavelength shift in fluorescence depends on a degree of hydrophobicity of the contaminated fluid sample;
   b. measuring the wavelength shift in fluorescence of the solvatochromatic tracer in the sample of the contaminated fluid;
   c. correcting the measured wavelength shift in fluorescence according to the degree to which the measured turbidity alters the measured wavelength shift in fluorescence, wherein said correcting provides a corrected measured wavelength shift in fluorescence;
   d. correlating the corrected measured wavelength shift in fluorescence to a level of the nonpolar contaminant in the contaminated fluid;
   e. introducing a dosage of at least one functional chemical into the contaminated fluid, wherein the at least one functional chemical decreases the presence of the nonpolar contaminant in the contaminated fluid; and
   f. using the level of the nonpolar contaminant in the contaminated fluid to control the dosage of the at least one functional chemical introduced to the contaminated fluid.

2. The method of claim 1 wherein the solvatochromatic tracer is 9-(Diethylamino)-5H-benzo[alpha]phenoxazine-5-one.

3. The method of claim 1 wherein the solvatochromatic tracer is 1-dimethylamino-5-sulfamoyl-naphthalene.

4. The method of claim 1 wherein the solvatochromatic tracer is pyrene.

5. The method of claim 1 wherein the solvatochromatic tracer is 1-pyrenecarbaldehyde.

6. The method of claim 1 wherein the solvatochromatic tracer is Reichardt's dye.

7. The method of claim 1 wherein the solvatochromatic tracer is 4-aminophthalimide.

8. The method of claim 1 wherein the solvatochromatic tracer is 4-(N,N-dimethylamino) phthalimide.

9. The method of claim 1 wherein the solvatochromatic tracer is bromonapthalene.

10. The method of claim 1 wherein the solvatochromatic tracer is 2-(dimethylamino) naphthalene.

11. The method of claim 1 wherein the fluorescence of the solvatochromatic tracer comprises a shifting $\lambda_{max}$ and wherein step b comprises measuring a wavelength shift of the shifting $\lambda_{max}$.

12. The method of claim 1 wherein the contaminated fluid is a wastewater stream.

13. The method of claim 1 wherein the contaminated fluid is an effluent of a waste water clarifier.

14. The method of claim 1 wherein the contaminated fluid is an influent of a waste water clarifier.

15. The method of claim 1 wherein the measured turbidity is due to solid particle contamination and the nonpolar contaminant.

16. The method of claim 1 further comprising measuring an effectiveness of the at least one functional chemical in decreasing the presence of the nonpolar contaminant in the contaminated fluid.

17. The method of claim 1 further comprising, after the at least one functional chemical is added to the contaminated fluid to provide a treated fluid, repeating steps a to d to further determine a corrected measured change in fluorescence of the treated fluid and using the further corrected measured change in fluorescence to determine an amount of the nonpolar contaminant in the treated fluid.

18. The method of claim 1 wherein the at least one functional chemical reduces, separates, or inactivates the nonpolar contaminant present in the contaminated fluid.

19. The method of claim 1 wherein the at least one functional chemical comprises one or more selected from the group consisting of: a biocide, a dispersant, a flocculant, a surfactant, an emulsifier, a demulsifier, and a corrosion inhibitor.

* * * * *